(12) United States Patent
Ogiwara

(10) Patent No.: US 12,325,165 B2
(45) Date of Patent: Jun. 10, 2025

(54) INJECTION SCREW FOR RIGID VINYL CHLORIDE

(71) Applicant: NISSEI PLASTIC INDUSTRIAL CO., LTD., Nagano (JP)

(72) Inventor: Haruo Ogiwara, Nagano (JP)

(73) Assignee: NISSEI PLASTIC INDUSTRIAL CO., LTD., Hanishina-gun (JP)

( * ) Notice: Subject to any disclaimer, the term of this patent is extended or adjusted under 35 U.S.C. 154(b) by 134 days.

(21) Appl. No.: 18/325,299

(22) Filed: May 30, 2023

(65) Prior Publication Data

US 2024/0033984 A1 Feb. 1, 2024

(30) Foreign Application Priority Data

Jul. 25, 2022 (JP) ................. 2022-117677

(51) Int. Cl.
*B29C 45/60* (2006.01)
*B29C 45/00* (2006.01)
*B29K 27/06* (2006.01)

(52) U.S. Cl.
CPC .......... *B29C 45/60* (2013.01); *B29C 45/0001* (2013.01); *B29K 2027/06* (2013.01)

(58) Field of Classification Search
CPC .... B29C 45/60; B29C 2045/605; B29C 48/52
See application file for complete search history.

(56) References Cited

U.S. PATENT DOCUMENTS 4,255,379 A * 3/1981 Frankland, Jr. ..... B29C 45/0001
264/537

FOREIGN PATENT DOCUMENTS

| JP | 2006-088533 A | 4/2006 |
| JP | 4124191 B2 * | 7/2008 |
| JP | 2009248422 A * | 10/2009 |
| JP | 2009279875 A * | 12/2009 |
| WO | WO-2016152853 A1 * | 9/2016 ............... B29B 7/42 |

* cited by examiner

*Primary Examiner* — Virak Nguon
(74) *Attorney, Agent, or Firm* — Rankin, Hill & Clark LLP

(57) ABSTRACT

A rigid vinyl chloride injection screw which kneads and injects rigid vinyl chloride includes a flight and a groove. L/D is set to be 19.1 where L is an effective screw length and D is a diameter of the injection screw. tf/tm is set to be 2.5 where tf is the width of the flight at a supply portion and tm is the width of the flight at a measure portion. hf/hm is set to be 2.1 where hf is the depth of the groove at the supply portion and hm is the depth of the groove at the measure portion. A compression ratio that is calculated from ((P−tf)×hf)/((P−tm)×hm) is set to be 1.74 where P is a pitch of the injection screw.

3 Claims, 6 Drawing Sheets

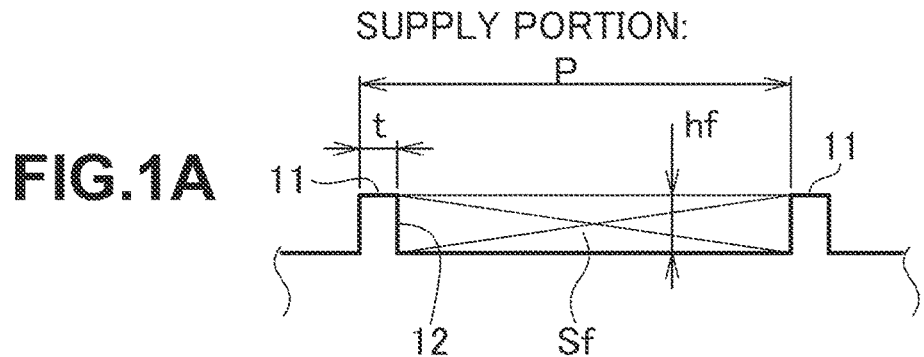
FIG.1A MODEL 2
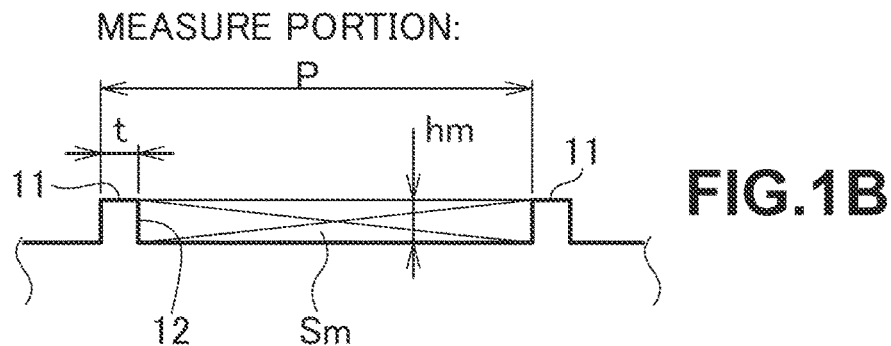
FIG.1B MODEL 2
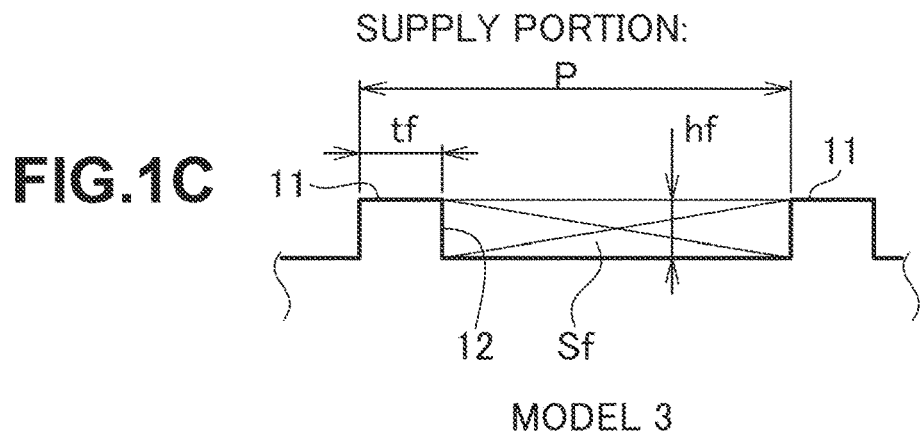
FIG.1C MODEL 3
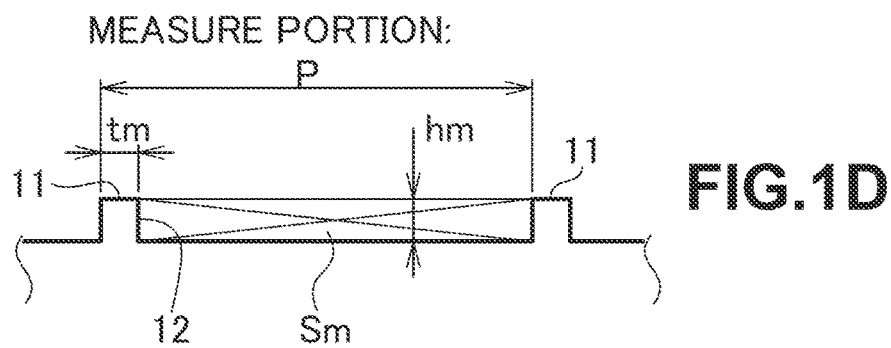
FIG.1D MODEL 3

INJECTION SCREW FOR RIGID VINYL CHLORIDE

FIELD OF THE INVENTION

The present disclosure relates to an injection screw for injection molding of rigid vinyl chloride.

BACKGROUND

Resin products are broadly produced by extrusion molding and by injection molding.

According to the extrusion molding, a resin material is extruded from an extruder. The extruder includes a heating cylinder, an extrusion screw, and a screw rotating mechanism. The resin material loaded in the heating cylinder is plasticized by kneading by the rotating extrusion screw and by heat from the heating cylinder.

When it is defined that an effective screw length is L and an outer diameter (will be simply referred to as "diameter" below) is D, L/D of the extrusion screw in the case of extrusion molding is made about 35.

According to injection molding, a resin material is injected from an injector to a metal mold. The injector includes a heating cylinder, an injection screw, a screw rotating mechanism, and a screw moving mechanism.

The resin material loaded in the heating cylinder is plasticized by kneading by the rotating injection screw and by heat from the heating cylinder. The plasticized resin material is accumulated at the front part of the heating cylinder, and the injection screw is moved back by such an accumulation. When moved back by a certain distance, the injection screw is then moved forward to inject the resin material.

When moved forward, the injection screw receives reaction force in the axial direction. When the reaction force in the axial direction exceeds a certain value, the injection screw is collapsed. Hence, in order to avoid the occurrence of such a collapse, L/D of the injection screw in the case of injection molding is made about to 22.

For example, Japan Patent No. 4124191 discloses such an injection screw.

The technology disclosed in Japan Patent No. 4124191 will be described with reference to FIG. 3.

FIG. 3 is a side view of a conventional injection screw, and an injection screw 110 is located in a heating cylinder 101 so as to be rotatable and movable in the axial direction.

The heating cylinder 101 includes a nozzle 102 at a tip, and also includes a heater 103 on the outer circumference.

Some of the necessary heat for plasticization is supplied by the heater 103. A plasticized resin material is injected from the nozzle 102 by the forward movement actuation of the injection screw 110.

The injection screw 110 includes a flight 111 corresponding to a spiral thread, and a groove 112 corresponding to a root of the screw thread.

Providing that an effective screw length of the injection screw 110 is L and a diameter is D, L/D disclosed in Japan Patent No. 4124191 is set to be 19 to 21.5.

Such an injection screw 110 is applied for injection of syndiotactic polymer that is a kind of resin material.

The inventors of the present disclosure attempted to inject rigid vinyl chloride using an injection screw equivalent to the injection screw 110.

[Model 1]

An injection screw 120 equivalent to the injection screw 110 is taken as a model 1. FIG. 4 illustrates the injection screw 120.

As illustrated in FIG. 4, the injection screw 120 includes a flight 121 and a groove 122, and a width t of the flight 121 and a pitch P thereof are constant. D is a diameter and L is an effective screw length.

An effective screw length L becomes the sum of a length Lf of a supply portion, a length Lc of a compression portion, and a length Lm of a measure portion.

A depth of the groove at the supply portion is hf, a depth of the groove at the compression portion is hc, and a depth of the groove at the measuring unit is hm.

TABLE 1 illustrates specifications of the injection screw 120.

The compression ratio in the lowest row of the TABLE is the compression ratio at the compression portion.

Since the pitch P is constant and the width t of the flight 121 is constant, the compression ratio is 2.10 obtained from a calculation (the depth hf of the groove at the supply portion)/(the depth hm of the groove at the measure portion) =10.5/5.0=2.10.

TABLE 1

| | SYMBOL | MODEL 1 |
|---|---|---|
| INJECTION SCREW DIAMETER | D | 80 mm |
| FLIGHT WIDTH | t | 8 mm |
| PITCH | P | 80 mm |
| EFFECTIVE SCREW LENGTH | L | 1525 mm |
| SUPPLY PORTION LENGTH | Lf | 877 mm |
| COMPRESSION PORTION LENGTH | Lc | 400 mm |
| MEASURE PORTION LENGTH | Lm | 248 mm |
| GROOVE DEPTH AT SUPPLY PORTION | hf | 10.5 mm |
| GROOVE DEPTH AT COMPRESSION PORTION | hc | 10.5 mm -> 5.0 mm |
| GROOVE DEPTH AT MEASURE PORTION | hm | 5.0 mm |
| RATIO | L/D | 19.1 |
| RATIO | Lf/D | 11.0 |
| RATIO | Lc/D | 5.0 |
| RATIO | Lm/D | 3.1 |
| RATIO | hf/D | 0.131 |
| RATIO | hm/D | 0.063 |
| COMPRESSION RATIO | — | 2.10 |

Rigid vinyl chloride was injected on a trial basis using the above-described screw 120. At that time, circuit pressure relating to the rotation of the screw 120 and the temperature of the nozzle (see FIG. 3, reference numeral 102) were measured.

Note that at the initial stage of shots, since there are a large number of variable factors, data and a situation at the eighth shot conceivable that such factors became substantially stabilized were checked.

TABLE 2

| | MODEL 1 |
|---|---|
| INJECTION SCREW SPECIFICATIONS | FIG. 4 TABLE 1 |
| RESIN MATERIAL | RIGID VINYL CHLORIDE |
| SCREW ROTATION SPEED | 10 rpm |

TABLE 2-continued

| | MODEL 1 |
|---|---|
| CIRCUIT PRESSURE AT EIGHTH SHOT | 14.7 MPa |
| NOZZLE TEMPERATURE AT EIGHTH SHOT | 171.3° C. |
| COLOR CHANGE PRESENCE/ABSENCE | COLOR CHANGE PRESENT |

Even at the eighth shot, a color change was observed in the injected rigid vinyl chloride. Hence, the result was dissatisfied according to the model 1. Note that the temperature of the nozzle at the eighth shot was 171.3° C.

This was further examined in detail. In comparison with other general-purpose resin materials, the rigid vinyl chloride has a high viscosity and has a self-heating properties by shear at the time of kneading. In addition, in comparison with other general-purpose resin materials, the rigid vinyl chloride has a high heat susceptibility, and is thermally decomposed. Hence, it becomes clear that a color change occurs because of such reasons. Such a color change is not acceptable in practice.

As for a provision against such a color change, since it is effective to decrease the temperature of a resin material, the inventors of the present disclosure though out to increase the depth as a scheme of decreasing the temperature. This will be described with reference to the figure.

FIG. 5 is an enlarged view of a major section in FIG. 3. As illustrated in FIG. 5, it is defined that the depth of a groove 112 is h. Since the temperature of the heating cylinder 101 is high and the temperature of the injection screw 110 is low, heat transfers from the heating cylinder 101 to the injection screw 110, and the resin material 115 is heated by the transferred heat.

When the depth h of the groove 112 is made shallow, the thickness of the resin material 115 decreases, a temperature gradient within the resin material 115 becomes small, and thus the temperature of the injection screw 110 increases. Consequently, the average temperature of the resin material 115 increases.

In contrast, when the depth h of the groove 112 is deep, the thickness of the resin material 115 increases, the temperature gradient within the resin material 115 becomes large, and thus the temperature of the injection screw 110 decreases. Consequently, the average temperature of the resin material 115 decreases.

When the groove 112 is made deep, it is expected that the average temperature of the resin material 115 decreases. A model that made a groove deeper will be referred to as a model 2.

[Model 2]

FIG. 6 illustrates an injection screw 130 that has a deeper groove than that of the injection screw 120.

As illustrated in FIG. 6, the injection screw 130 includes a flight 131 and a groove 132, and a width t of the flight 131 and a pitch P thereof are constant. D is a diameter, and L is an effective screw length.

TABLE 3 illustrates specifications of the injection screw 130. Note that those of the model 1 are also shown as references.

TABLE 3

| | SYMBOL | (MODEL 1) | MODEL 2 |
|---|---|---|---|
| INJECTION SCREW DIAMETER | D | 80 mm | 80 mm |
| FLIGHT WIDTH | t | 8 mm | 8 mm |
| PITCH | P | 80 mm | 80 mm |
| EFFECTIVE SCREW LENGTH | L | 1525 mm | 1525 mm |
| SUPPLY PORTION LENGTH | Lf | 877 mm | 600 mm |
| COMPRESSION PORTION LENGTH | Lc | 400 mm | 725 mm |
| MEASURE PORTION LENGTH | Lm | 248 mm | 200 mm |
| GROOVE DEPTH AT SUPPLY PORTION | hf | 10.5 mm | 12.8 mm |
| GROOVE DEPTH AT COMPRESSION PORTION | hc | 10.5 mm -> 5.0 mm | 12.8 mm -> 6.4 mm |
| GROOVE DEPTH AT MEASURE PORTION | hm | 5.0 mm | 6.4 mm |
| RATIO | L/D | 19.1 | 19.1 |
| RATIO | Lf/D | 11.0 | 7.5 |
| RATIO | Lc/D | 5.0 | 9.1 |
| RATIO | Lm/D | 3.1 | 2.5 |
| RATIO | hf/D | 0.131 | 0.160 |
| RATIO | hm/D | 0.063 | 0.08 |
| COMPRESSION RATIO | — | 2.10 | 2.00 |

That is, the depth hf of the groove at the supply portion was changed from 10.5 mm to 12.8 mm, and the depth hm of the measure portion was changed from 5.0 mm to 6.4 mm. In order to maintain the compression ratio to be 2.00 or so, the length Lc of the compression portion was changed from 400 mm to 725 mm.

TABLE 4 illustrates the results.

TABLE 4

|  | (MODEL 1) | MODEL 2 |
|---|---|---|
| INJECTION SCREW | FIG. 4 | FIG. 6 |
| SPECIFICATIONS | TABLE 1 | TABLE 3 |
| RESIN MATERIAL | RIGID VINYL CHLORIDE | RIGID VINYL CHLORIDE |
| SCREW ROTATION SPEED | 10 rpm | 10 rpm |
| CIRCUIT PRESSURE AT EIGHTH SHOT | 14.7 MPa | 14.6 MPa |
| NOZZLE TEMPERATURE AT EIGHTH SHOT | 171.3° C. | 170.6° C. |
| COLOR CHANGE PRESENCE/ABSENCE | COLOR CHANGE PRESENT | SLIGHT COLOR CHANGE PRESENT |
| EVALUATION | NO GOOD | NO GOOD |

According to the model 1, although the nozzle temperature was 171.3° C., according to the model 2, the nozzle temperature became 170.6° C., which was a temperature drop by 0.7° C.

Consequently, the color change level was suppressed. However, a color change was still observed, and this is still dissatisfied.

Since a color change is not acceptable in practice, a rigid vinyl chloride injection screw that is suitable for rigid vinyl chloride so as not to cause a color change is desirable.

SUMMARY OF THE INVENTION

An objective of the present disclosure is to provide a rigid vinyl chloride injection screw suitable for rigid vinyl chloride.

The inventors of the present disclosure reached a thought such that, in addition to by making a groove deep, by decreasing a compression ratio, a temperature would be reduced. This is because the smaller the compression ratio is, the more the heat generation by compression is suppressed.

FIG. 1 is an exemplary diagram for describing the width of a flight and the depth thereof.

FIG. 1A illustrates a groove 12 at a supply portion according to the model 2, and a lengthwise area Sf of the groove is (P−t)×hf.

FIG. 1B illustrates a groove 12 at a measure portion according to the model 2, and a lengthwise area Sm of the groove is (P−t)×hm.

A compression ratio is expressed by Sf/Sm.

Sf/Sm=((P−t)×hf)/((P−t)×hm), and (P−t) is eliminated from a denominator and a molecule. Hence, this formula becomes Sf/Sm=hf/hm.

That is, when P is constant and a width t of the flight is constant, the compression ratio becomes hf/hm.

An improved model of the model 2 will be defined as a model 3.

FIG. 1C illustrates a groove 12 at a supply portion according to the model 3, and a lengthwise area Sf of the groove is (P−tf)×hf.

FIG. 1D illustrates a groove 12 at a measure portion according to the model 3, and a lengthwise area Sm of the groove is (P−tm)×hm.

A compression ratio is expressed by Sf/Sm.

Hence, compression ratio=Sf/Sm=((P−tf)×hf)/((P−tm)×hm).

In the above formula, P is a pitch. tf is the width of the flight at the supply portion. hf is the depth of the groove at the supply portion. tm is the width of the flight at the measure portion. hm is the depth of the groove at the measure portion.

In ((P−tf)×hf)/((P−tm)×hm), when tf increases, (P−tf) decreases, and thus the compression ratio decreases.

That is, the compression ratio can be changed by changing the width tf of the flight at the supply portion. The greater tf is, the smaller the compression ratio becomes. When the compression ratio decreases, a resin temperature decreases.

Although detailed forms and specifications of the model 3 will be described later, according to the model 3, a color change was eliminated, and thus a preferable result was accomplished. The present disclosure that is achieved from such technical knowledges is as follows.

According to a first embodiment of the present disclosure, there is provided a rigid vinyl chloride injection screw which kneads and injects rigid vinyl chloride and which includes: a flight; and a groove, in which:

an effective screw length is distinguished at a supply portion, a compression portion, and a measure portion, a width of the flight at the supply portion is set to be wider than a width of the flight at the measure portion, and a depth of the groove at the supply portion is set to be larger than a depth of the groove at the measure portion;

L/D is set to be 19.1 where L is the effective screw length and D is a diameter of the injection screw;

tf/tm is set to be 2.5 where tf is the width of the flight at the supply portion and tm is the width of the flight at the measure portion;

hf/hm is set to be 2.1 where hf is the depth of the groove at the supply portion and hm is the depth of the groove at the measure portion, and a compression ratio that is calculated from ((P−t)×hf)/((P−tm)×hm) is set to be 1.74 where P is a pitch of the injection screw.

According to the present disclosure, the rigid vinyl chloride injection screw has L/D set to be 19.1, has tf/tm set to be 2.5, has hf/hm set to be 2.1, and has the compression ratio set to be 1.74.

Conventionally, the compression ratio is usually set to be around 2.00, but according to the present disclosure, such a ratio is set to be 1.74. This causes the temperature of a resin to decrease, causing rigid vinyl chloride that is sensitive for temperature not to make a color change.

Moreover, rigid vinyl chloride has a higher viscosity than those of other resin materials, and thus rotation torque to rotate the injection screw increases.

According to the present disclosure, the compression ratio is reduced that is 1.74, and the supply amount of the resin material is reduced by increasing the width tf of the flight at the supply portion. Consequently, the rotation torque can be reduced.

As described above, according to the present disclosure, there is provided a rigid vinyl chloride injection screw suitable for rigid vinyl chloride.

Based on the model 3, when the model 4 and the several subsequent models were examined, the actions and advantageous effects similar to those of the present disclosure were confirmed.

According to a second embodiment of the present disclosure, there is provided a rigid vinyl chloride injection screw which kneads and injects rigid vinyl chloride and which includes: a flight; and a groove, in which:

an effective screw length is distinguished at a supply portion, a compression portion, and a measure portion, a width of the flight at the supply portion is set to be wider than a width of the flight at the measure portion, and a depth of the groove at the supply portion is set to be larger than a depth of the groove at the measure portion;

L/D is set to be in a range that is 17.0 to 19.5 where L is the effective screw length and D is a diameter of the injection screw;

tf/tm is set to be in a range that is 2.3 to 3.0 where tf is the width of the flight at the supply portion and tm is the width of the flight at the measure portion;

hf/hm is set to be in a range that is 2.0 to 2.2 where hf is the depth of the groove at the supply portion and hm is the depth of the groove at the measure portion; and a compression ratio that is calculated from $((P-tf) \times hf)/((P-tm) \times hm)$ is set to be in a range that is 1.63 to 1.81 where P is a pitch of the injection screw.

According to the present disclosure, the rigid vinyl chloride injection screw has L/D set to be in a range that is 17.0 to 19.5, has tf/tm set to be in a range that is 2.3 to 3.0, has hf/hm set to be in a range that is 2.0 to 2.2, and has the compression ratio set to be in a range that is 1.63 to 1.81.

Conventionally, the compression ratio is often set to be around 2.00, but according to the present disclosure, such a ratio is set to be 1.63 to 1.81. This causes the temperature of a resin to decrease, causing rigid vinyl chloride that is sensitive for temperature not to make a color change.

Moreover, rigid vinyl chloride has a higher viscosity than those of other resin materials, and thus rotation torque to rotate the injection screw increases.

According to the present disclosure, the compression ratio is reduced that is 1.63 to 1.81, and the supply amount of the resin material is reduced by increasing the width tf of the flight at the supply portion. Consequently, the rotation torque can be reduced.

As described above, according to the present disclosure, there is provided a rigid vinyl chloride injection screw suitable for rigid vinyl chloride.

Preferably, the above-described L/D is 17.0.

The rotation torque is substantially proportional to the length L of the screw. Since L/D is 17.0, the rotation torque is minimized.

BRIEF DESCRIPTION OF THE DRAWINGS

Several preferable embodiments of the present disclosure will be described in detail with reference to the accompanying figures in which:

FIG. 1A is an exemplary diagram for describing a width of a flight and a depth of a groove at a supply portion of the model 2;

FIG. 1B is an exemplary diagram for describing a width of a flight and a depth of a groove at a measure portion of the model 2;

FIG. 1C is an exemplary diagram for describing a width of a flight and a depth of a groove at a supply portion of the model 3;

FIG. 1D is an exemplary diagram for describing a width of a flight and a depth of a groove at a measure portion of the model 3;

DETAILED DESCRIPTION OF THE EMBODIMENTS

Embodiments of the present disclosure will be described below with reference to the accompanying figures.

[Model 3]

Figure 2:
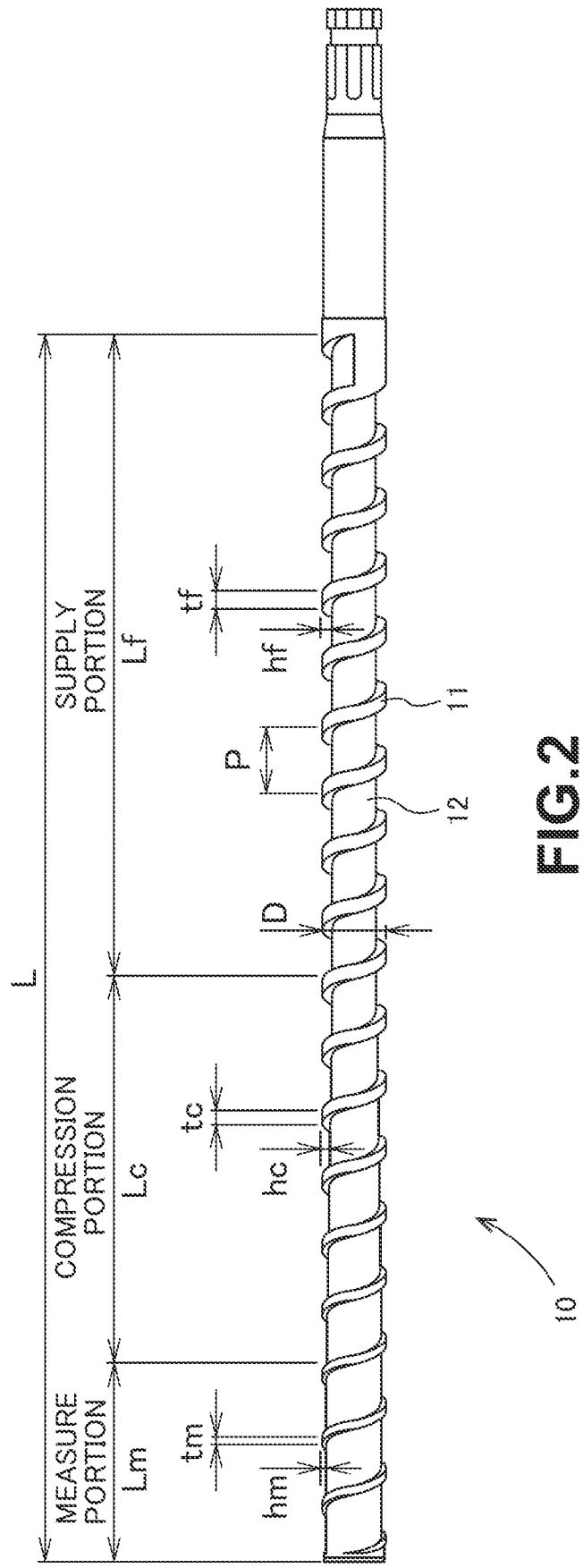
FIG. 2 is a side view of an injection screw for rigid vinyl chloride according to the present disclosure.

As illustrated in FIG. 2, an injection screw 10 for rigid vinyl chloride (will be referred to as an "injection screw" 10 below) includes a flight 11 corresponding to a spiral screw thread, and a spiral groove 12. The width of the flight 11 differs portion by portion.

When a width of the flight 11 at a supply portion, a width of the flight 11 at a compression portion, and a width of the flight 11 at a measure portion are defined as tf, tc and tm, respectively, the width of the flight 11 at the supply portion is set to be twice to three times to the width tm of the flight 11 at the measure portion. The width tc of the flight 11 at the compression portion gradually changes from the width tf of the flight 11 at the supply portion to the width tm of the flight 11 at the measure portion.

In addition, a diameter of the injection screw is defined as D, a pitch is defined as P, and an effective screw length is defined as L.

The effective screw length L is the sum of a length Lf of the supply portion, a length Lc of the compression portion, and a length Lm of the measure portion.

A depth of the groove at the supply portion, a depth of the groove at the compression portion, and a depth of the groove at the measure portion are defined as hf, hc, and hm, respectively.

TABLE 5 shows the specifications of the injection screw 10 according to the model 3. Note that those of the model 2 are also shown as references.

TABLE 5

|  | (MODEL 2) | | MODEL 3 | |
|---|---|---|---|---|
|  | SYMBOL | LENGTH, ETC. | SYMBOL | LENGTH, ETC. |
| INJECTION SCREW DIAMETER | D | 80 mm | D | 80 mm |
| FLIGHT WIDTH | t | 8 mm | tf | 20 mm |
|  |  |  | tc | 20 mm -> 8 mm |
|  |  |  | tm | 8 mm |
| PITCH | P | 80 mm | P | 80 mm |
| EFFECTIVE SCREW LENGTH | L | 1525 mm | L | 1525 mm |
| SUPPLY PORTION LENGTH | Lf | 600 mm | Lf | 797 mm |
| COMPRESSION PORTION LENGTH | Lc | 725 mm | Lc | 480 mm |
| MEASURE PORTION LENGTH | Lm | 200 mm | Lm | 248 mm |
| GROOVE DEPTH AT SUPPLY PORTION | hf | 12.8 mm | hf | 12.35 mm |
| GROOVE DEPTH AT COMPRESSION PORTION | hc | 12.8 mm -> 6.4 mm | hc | 12.35 mm -> 5.9 mm |
| GROOVE DEPTH AT MEASURE PORTION | hm | 6.4 mm | hm | 5.9 mm |
| RATIO | L/D | 19.1 | L/D | 19.1 |
| RATIO | Lf/D | 7.5 | Lf/D | 10.00 |
| RATIO | Lc/D | 9.1 | Lc/D | 6.00 |
| RATIO | Lm/D | 2.5 | Lm/D | 3.1 |
| RATIO | hf/D | 0.160 | hf/D | 0.154 |
| RATIO | hm/D | 0.080 | hm/D | 0.074 |
| COMPRESSION RATIO | — | 2.00 | — | 1.74 |

According to the model 3, the width tf of the flight at the supply portion was increased that was 20 mm, and the width tm of the flight at the measure portion was maintained as 8 mm.

Moreover, while the effective screw length L was maintained at 1525 mm, the length Lf of the supply portion was increased that was 797 mm, the length Lc of the compression portion was reduced that was 480 mm, and the length Lm of the measure portion was set to 248 mm.

Moreover, the depth hf of the groove at the supply portion was made slightly shallow that was 12.35 mm, and the depth hm of the groove at the measure portion was made slightly shallow that was 5.9 mm.

The compression ratio is calculated from $((P-tf) \times hf)/((P-tm) \times hm)$.

From the calculation that is $((80-20) \times 12.35)/((80-8) \times 5.9)=1.74$, the compression ratio is thus 1.74. In comparison with the model 2, the compression ratio of the model 3 was reduced.

Figure 3:
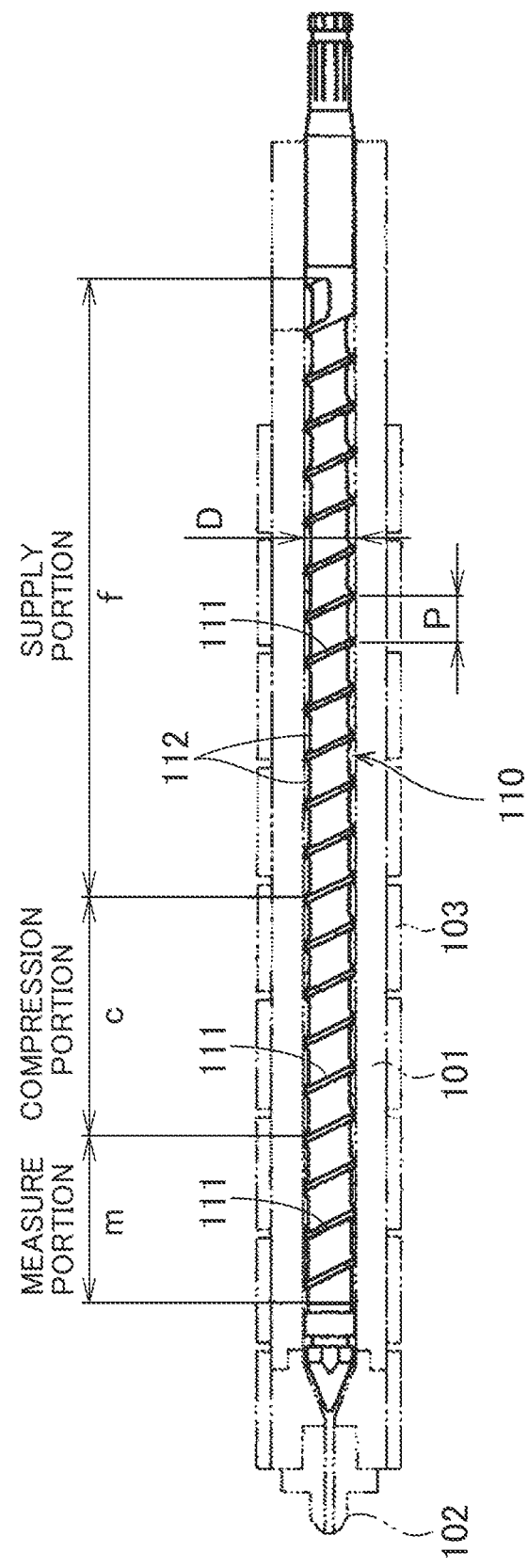
FIG. 3 is a side view of a conventional injection screw.
Figure 4:
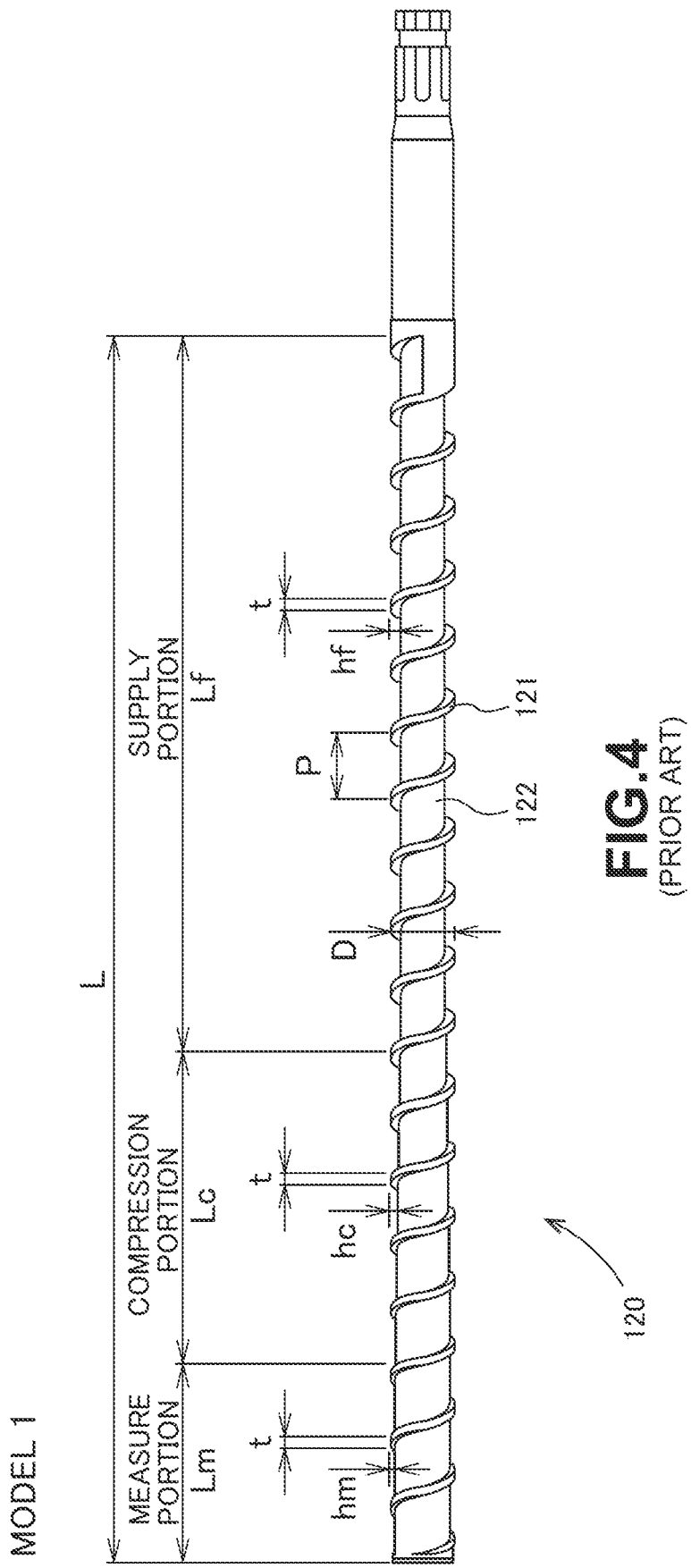
FIG. 4 is a side view of another conventional injection screw.
Figure 5:
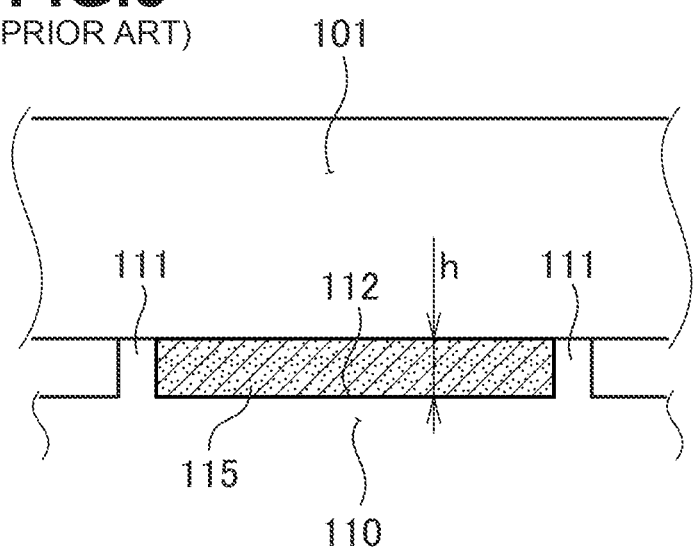
FIG. 5 is an enlarged view of a major section in FIG. 3.

Rigid vinyl chloride was injected on a trial basis using the above-described injection screw 10. At this time, circuit pressure relating to the rotation of the injection screw 10 and the temperature of the nozzle (see FIG. 3, reference numeral 102) were measured.

Note that at the initial stage of shots, since there are many variable factors, a state at the eighth shot conceivable as substantially stable was examined.

TABLE 6 shows the results. Note that those of the model 2 are also shown as references.

ratio decreased to 1.74, the following advantageous effects to be described below are accomplished from the model 3.

First, the circuit pressure changed from 14.6 MPa to 12.3 MPa.

Next, no color change was observed. That is, a disadvantage that is a color change is addressed. The temperature of the nozzle changed from 170.6° C. to 169.7° C. It is thought that such a disadvantage is addressed because the temperature of the nozzle decreased.

That is, according to the model 3, the width tc of the flight at the measure portion was kept unchanged at 8 mm, but the width tf of the flight at the supply portion was set to 20 mm, and thus the compression ratio decreased. Hence, a disadvantage that is a color change is addressed. In addition, the plasticization was excellent, and the rotation torque was reduced.

Consequently, a rigid vinyl chloride injection screw that is suitable for rigid vinyl chloride is provided by the model 3.

That is, according to the model 3, the injection screw 10 that employs the structure to be described below is provided.

The injection screw 10 which kneads and injects rigid vinyl chloride includes the flight 11 and the groove 12. In the rigid vinyl chloride injection screw 10, the effective screw length L is distinguished at the supply portion, the compression portion, and the measure portion. The width tf of the flight at the supply portion is set to be wider than the width tm of the flight at the measure portion. The depth hf of the

TABLE 6

Figure 6:
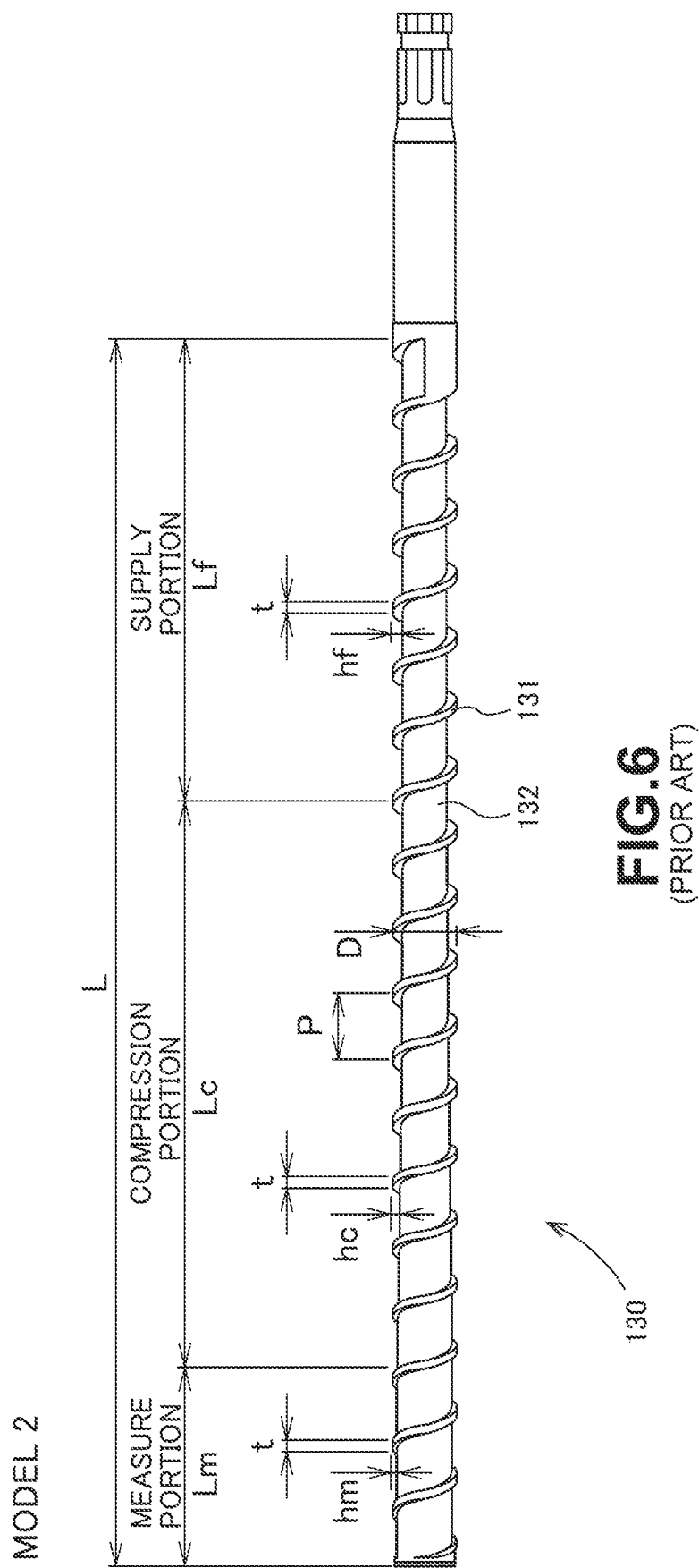
FIG. 6 is a side view of the other conventional injection screw.

|  | (MODEL 2) | MODEL 3 |
|---|---|---|
| INJECTION SCREW | FIG. 6 | FIG. 2 |
| SPECIFICATIONS | TABLE 3 | TABLE 5 |
| RESIN MATERIAL | RIGID VINYL CHLORIDE | RIGID VINYL CHLORIDE |
| SCREW ROTATION SPEED | 10 rpm | 10 rpm |
| CIRCUIT PRESSURE AT EIGHTH SHOT | 14.6 MPa | 12.3 MPa |
| NOZZLE TEMPERATURE AT EIGHTH SHOT | 170.6° C. | 169.7° C. |
| COLOR CHANGE PRESENCE/ABSENCE | SLIGHT COLOR CHANGE PRESENT | NO COLOR CHANGE PRESENT |
| EVALUATION | NO GOOD | GOOD |

According to the model 2, although the compression ratio was 2.00, according to the model 3, since the compression groove at the supply portion is set to be larger than the depth hm of the groove at the measure portion.

L/D is set to be 19.1 that is obtained from a calculation that is 1525/80=19.06 where L is the effective screw length and D is the diameter of the injection screw.

tf/tm is set to be 2.5 that is obtained from a calculation that is 20/8=2.5 where tf is the width of the flight at the supply portion and tm is the width of the flight at the measure portion.

hf/hm is set to be 2.1 that is obtained from a calculation that is 12.35/5.9=2.09 where hf is the depth of the groove at the supply portion and hm is the depth of the groove at the measure portion.

The rigid vinyl chloride injection screw is provided which has a compression ratio that is that is calculated from ((P−tf)×hf)/((P−tm)×hm) is set to be 1.74 (the detailed calculation has been described above, thus omitted) where P is the pitch of the injection screw.

Next, on the basis of the model 3, extension of the model is attempted. For such a purpose, a model 4 and subsequent models were examined. TABLE 7 shows the results.

(Evaluation on Model 5)

According to the model 5, the compression ratio increased to 1.86. Hence, a color change was observed. Consequently, the result and evaluation are "no good".

[Model 6]
(Difference and Similarity Relative to Model 3)

According to a model 6, the width tf of the flight at the supply portion was elongated to 24 mm. The other specifications were the same as those of the model 3.

(Evaluation on Model 6)

According to the model 6, the compression ratio was 1.63. Since the compression ratio decreased, no color change occurred. Since the plasticization was excellent, the evaluation is thus concluded as "good".

[Model 7]
(Difference and Similarity Relative to Model 3)

According to a model 7, the width tf of the flight at the supply portion was further elongated to 28 mm. The other specifications were the same as those of the model 3.

TABLE 7

| | SYMBOL | (MODEL 3) | MODEL 4 | MODEL 5 | MODEL 6 |
|---|---|---|---|---|---|
| COMMON | | EFFECTIVE SCREW LENGTH L: 1525 mm INJECTION SCREW DIAMETER D: 80 mm L/D: 19.1 | | | |
| PITCH | P | 80 mm | 80 mm | 80 mm | 80 mm |
| FLIGHT WIDTH | tf | 20 mm | 18 mm | 16 mm | 24 mm |
| | tf/D | 0.25 | 0.22 | 0.20 | 0.30 |
| | tm | 8 mm | 8 mm | 8 mm | 8 mm |
| | tm/D | 0.10 | 0.10 | 0.10 | 0.10 |
| | tf/tm | 2.5 | 2.3 | 2.0 | 3.0 |
| GROOVE DEPTH | hf | 12.35 | 12.35 | 12.35 | 12.35 |
| | hm | 5.9 mm | 5.9 mm | 5.9 mm | 5.9 mm |
| | hf/hm | 2.1 | 2.1 | 2.1 | 2.1 |
| COLOR CHANGE | — | | NONE | NONE | SLIGHTLY PRESENT | NONE |
| PLASTICIZATION EVALUATION | — | | EXELLENT | EXELLENT | EXELLENT | EXELLENT |
| EVALUATION | — | | GOOD | GOOD | NO GOOD | GOOD |
| COMPRESSION RATIO | — | | 1.74 | 1.80 | 1.86 | 1.63 |

| | SYMBOL | MODEL 7 | MODEL 8 | MODEL 9 | MODEL 10 | MODEL 11 |
|---|---|---|---|---|---|---|
| COMMON | | EFFECTIVE SCREW LENGTH L: 1525 mm INJECTION SCREW DIAMETER D: 80 mm L/D: 19.1 | | | | |
| PITCH | P | 80 mm | 80 mm | 80 mm | 80 mm | 80 mm |
| FLIGHT WIDTH | tf | 28 mm | 20 mm | 20 mm | 20 mm | 20 mm |
| | tf/D | 0.35 | 0.25 | 0.25 | 0.25 | 0.25 |
| | tm | 8 mm | 8 mm | 8 mm | 8 mm | 8 mm |
| | tm/D | 0.10 | 0.10 | 0.10 | 0.10 | 0.10 |
| | tf/tm | 3.5 | 2.5 | 2.5 | 2.5 | 2.5 |
| GROOVE DEPTH | hf | 12.35 | 12.85 | 13.15 | 12.05 | 11.35 |
| | hm | 5.9 mm | 5.9 mm | 5.8 mm | 6.0 mm | 6.2 mm |
| | hf/hm | 2.1 | 2.2 | 2.3 | 2.0 | 1.8 |
| COLOR CHANGE | — | NONE | NONE | PRESENT | NONE | NONE |
| PLASTICIZATION EVALUATION | — | BAD | EXELLENT | EXELLENT | EXELLENT | BAD |
| EVALUATION | — | NO GOOD | GOOD | NO GOOD | GOOD | NO GOOD |
| COMPRESSION RATIO | — | 1.51 | 1.81 | 1.89 | 1.67 | 1.53 |

[Model 4]
(Difference and Similarity Relative to Model 3)

According to the model 4, the width tf of the flight at the supply portion was narrowed to 18 mm. The other specifications were the same as those of the model 3.

(Evaluation on Model 4)

According to the model 4, although the compression ratio slightly increased that was 1.80, no color change occurred. Since the plasticization was excellent, the evaluation is thus concluded as "good".

[Model 5]
(Difference and Similarity Relative to Model 3)

According to a model 5, the width tf of the flight at the supply portion was further narrowed to 16 mm. The other specifications were the same as those of the model 3.

(Evaluation on Model 7)

According to the model 7, the compression ratio was 1.51. The compression ratio decreased and no color change occurred. However, the plasticization was inadequate. This may be because of the insufficient compression. The result and evaluation are thus concluded as "no good".

[Model 8]
(Difference and Similarity Relative to Model 3)

According to a model 8, the depth hf of the groove at the supply portion was made deep that was 12.85 mm. The other specifications were the same as those of the model 3.

(Evaluation on Model 8)

According to a model 8, the compression ratio was 1.81. Although the compression ratio slightly increased, no color change occurred. Since the plasticization was excellent, the evaluation is thus concluded as "good".

[Model 9]
(Difference and Similarity Relative to Model 3)

According to a model 9, the depth hf of the groove at the supply portion was made further deep that was 13.15 mm. The other specifications were the same as those of the model 3.

(Evaluation on Model 9)

According to the model 9, a color change was observed. This may be because of the increase in compression ratio increased to 1.89. The result and evaluation are thus concluded as "no good".

[Model 10]
(Difference and Similarity Relative to Model 3)

According to a model 10, the depth hf of the groove at the supply portion was made shallow that was 12.05 mm. The other specifications were the same as those of the model 3.

(Evaluation on Model 10)

According to the model 10, since the compression ratio decreased to 1.67, no color change occurred. Since the plasticization was excellent, the evaluation is thus concluded as "good".

[Model 11]
(Difference and Similarity Relative to Model 3)

According to a model 11, the depth hf of the groove at the supply portion was made further shallow that was 11.35 mm. The other specifications were the same as those of the model 3.

(Evaluation on Model 11)

According to the model 11, the compression ratio was 1.53. Since the compression ratio decreased, no color change occurred. However, the plasticization was improper. This may be because of the insufficient compression. The result and evaluation are thus concluded as "no good".

(Matters that Became Clear from Model 4 to Model 11)

The following points became clear from the model 4 to the model 11.

It is recommended that the ratio of the width of the flight (tf/tm) should be 2.3 to 3.0.

It is recommended that the ratio of the depth of the groove (hf/hm) should be 2.0 to 2.2.

It is recommended that the compression ratio should be 1.63 to 1.81.

Next, the recommended range of the ratio (L/D) will be examined. In order to do so, a model 12 and subsequent models were examined. TABLE 8 shows the results.

[Model 12]
(Difference and Similarity Relative to Model 3)

According to the model 12, the effective screw length L was 1560 mm which was extended by 35 mm. L/D became 19.5. Lf, Lc, and Lm were also changed in accordance with a change in such a length. The other specifications were the same as those of the model 3.

(Evaluation on Model 12)

According to the model 12, since the effective screw length L increased, the circuit pressure slightly increased that was 12.7 MPa, but no color change occurred. The plasticization was excellent. It is defined that an expected value of the circuit pressure is equal to or smaller than 13.0 MPa. Since the circuit pressure was 12.7 MPa, the evaluation is thus concluded as "good".

[Model 13]
(Difference and Similarity Relative to Model 3)

According to a model 13, the effective screw length L was further increased that was 1615 mm. L/D became 20.2. Lf, Lc, and Lm were also changed in accordance with a change in such a length. The other specifications were the same as those of the model 3.

(Evaluation on Model 13)

According to the model 13, since the effective screw length L was further increased, the circuit pressure increased that was 13.1 MPa, but no color change occurred. The plasticization was excellent. However, since the circuit pressure became 13.1 MPa that exceeds the expected value of the circuit pressure that is 13.0 MPa, the evaluation is thus concluded as "no good".

[Model 14]
(Difference and Similarity Relative to Model 3)

According to a model 14, the effective screw length L was shortened that was 1445 mm. L/D became 18.1. Lf, Lc, and Lm were also changed in accordance with a change in such a length. The other specifications were the same as those of the model 3.

(Evaluation on Model 14)

According to the model 14, since the effective screw length L was decreased, the circuit pressure decreased that was 11.8 MPa, and no color change occurred. The evaluation is thus concluded as "good".

TABLE 8

|  | SYMBOL | (MODEL 3) | MODEL 12 | MODEL 13 | MODEL 14 | MODEL 15 | MODEL 16 |
| --- | --- | --- | --- | --- | --- | --- | --- |
| COMMON | | INJECTION SCREW DIAMETER D: 80 mm PITCH P: 80 mm COMPRESSION RATIO: 1.74 | | | | | |
| FLIGHT WIDTH | tf | 20 mm | 20 mm | 20 mm | 20 mm | 20 mm | 20 mm |
|  | tm | 8 mm | 8 mm | 8 mm | 8 mm | 8 mm | 8 mm |
|  | tf/tm | 2.5 | 2.5 | 2.5 | 2.5 | 2.5 | 2.5 |
| GROOVE DEPTH | hf | 12.35 mm | 12.35 mm | 12.35 mm | 12.35 mm | 12.35 mm | 12.35 mm |
|  | hm | 5.9 mm | 5.9 mm | 5.9 mm | 5.9 mm | 5.9 mm | 5.9 mm |
|  | hf/hm | 2.1 | 2.1 | 2.1 | 2.1 | 2.1 | 2.1 |
| EFFECTIVE SCREW LENGTH | L | 1525 mm | 1560 mm | 1615 mm | 1445 mm | 1360 mm | 1325 mm |
| SUPPLY PORTION LENGTH | Lf | 797 mm | 822 mm | 867 mm | 757 mm | 697 mm | 687 mm |
| COMPRESSION PORTION LENGTH | Lc | 480 mm | 490 mm | 500 mm | 460 mm | 440 mm | 430 mm |
| MEASURE PORTION LENGTH | Lm | 248 mm | 248 mm | 248 mm | 228 mm | 223 mm | 208 mm |
| CIRCUIT PRESSURE | — | 12.3 MPa | 12.7 MPa | 13.1 MPa | 11.8 MPa | 10.8 MPa | 10.3 MPa |
| COLOR CHANGE | — | NONE | NONE | NONE | NONE | NONE | NONE |
| PLASTICIZATION | — | EXELLENT | EXELLENT | EXELLENT | EXELLENT | EXELLENT | BAD |
| CIRCUIT PRESSURE EVALUATION | — | GOOD | GOOD | NO GOOD | GOOD | GOOD | GOOD |
| EVALUATION | — | GOOD | GOOD | NO GOOD | GOOD | GOOD | NO GOOD |
| L/D | — | 19.1 | 19.5 | 20.2 | 18.1 | 17.0 | 16.6 |

[Model 15]
(Difference and Similarity Relative to Model 3)

According to a model 15, the effective screw length L was further shortened that was 1360 mm. L/D became 17.0. Lf, Lc, and Lm were also changed in accordance with a change in such a length. The other specifications were the same as those of the model 3.

(Evaluation of the Model 15)

According to the model 15, since the effective screw length L was further decreased, the circuit pressure decreased that was 10.8 MPa, and no color change occurred. The evaluation is thus concluded as "good".

[Model 16]
(Difference and Similarity Relative to Model 3)

According to a model 16, the effective screw length L was further shortened that was 1325 mm. L/D became 16.6. Lf, Lc, and Lm were also changed in accordance with a change in such a length. The other specifications were the same as those of the model 3.

(Evaluation on Model 16)

According to the model 16, since the effective screw length L was further decreased, the circuit pressure decreased that was 10.3 MPa. The inadequate plasticization was observed although no color change occurred. This may be because of the insufficient effective screw length L. The result and evaluation are thus concluded as "no good".

(Matters which Became Clear from Model 12 to Model 16)

The following points became clear from the model 12 to the model 16.

It is recommended that the ratio of the length of the screw (L/D) should be 17.0 to 19.5 in view of L/D in the lowest row of TABLE 8, and the evaluation thereabove.

The following points became clear when the models 4 to 11 and the models 12 to 16 are comprehensively considered.

(Matters which Became Clear from Model 4 to Model 16)

It is recommended that the ratio of the length of the screw (L/D) should be 17.0 to 19.5.

It is recommended that the ratio of the width of the flight (tf/tm) should be 2.3 to 3.0.

It is recommended that the ratio of the depth of the groove (hf/hm) should be 2.0-2.2.

It is recommended that the compression ratio should be 1.63 to 1.81.

Note that the model 5 shown in TABLE 7 has (tf/tm) that is 2.0, which is out of the above-described range (2.3 to 3.0).

The model 7 shown in TABLE 7 has (tf/tm) that is 3.5, which is out of the above-described range (2.3 to 3.0).

The model 9 shown in TABLE 7 has (hf/hm) that is 2.3, which is out of the above-described range (2.0 to 2.2).

The model 11 shown in TABLE 7 has (hf/hm) that is 1.8, which is out of the above-described range (2.0 to 2.2).

According to the model 13 shown in TABLE 8, (L/D) is 20.2, which is out of the above-described range (17.0-19.5).

According to the model 16 shown in TABLE 8, (L/D) is 16.6, which is out of the above-described range (17.0-19.5).

Regarding the model 4, the model 6, the model 8, the model 10, the model 12, the model 14, and the model 15, the specific values fall within the above-described range group.

That is, according to the model 4, the model 6, the model 8, the model 10, the model 12, the model 14, and the model 15, the injection screw 10 that employs the following structure is provided.

The injection screw 10 which kneads and injects rigid vinyl chloride includes the flight 11 and the groove 12. In the rigid vinyl chloride injection screw 10, the effective screw length L is distinguished at the supply portion, the compression portion, and the measure portion, the width of the flight hf at the supply portion is set to be wider than the width tm of the flight at the measure portion, and the depth tf of the groove at the supply portion is set to be larger than the depth tm of the groove at the measure portion.

L/D is set to be in a range that is 17.0 to 19.5 where L is the effective screw length and D is the diameter of the injection screw.

tf/tm is set to be in a range that is 2.3 to 3.0 where tf is the width of the flight at the supply portion and tm is the width of the flight at the measure portion.

hf/hm is set to be in a range that is 2.0 to 2.2 where hf is the depth of the groove at the supply portion and hm is the depth of the groove at the measure portion.

The compression ratio calculated by $((P-tf) \times hf)/((P-tm) \times hm)$ is set to be in a range that is 1.63 to 1.81 where P is the pitch of the injection screw.

Experientially, the inventors of the present disclosure have already obtained a technical knowledge such that when the measure portion is long and the compression portion is long, the temperature of a resin material increases, and thus a defect occurs.

Accordingly, as for the length Lf of the supply portion, the length Lc of the compression portion, and the length Lm of the measure portion, a model 17 and subsequent model were examined. TABLE 9 shows the results.

TABLE 9

| | SYMBOL | (MODEL 3) | MODEL 17 | MODEl 18 | MODEL 19 | MODEL 20 |
|---|---|---|---|---|---|---|
| COMMON | | INJECTION SCREW DIAMETER D: 80 mm PITCH P: 80 mm COMPRESSION RATIO: 1.74 | | | | |
| FLIGHT WIDTH | tf | 20 mm | 20 mm | 20 mm | 20 mm | 20 mm |
| | tm | 8 mm | 8 mm | 8 mm | 8 mm | 8 mm |
| | tf/tm | 2.5 | 2.5 | 2.5 | 2.5 | 2.5 |
| GROOVE DEPTH | hf | 12.35 mm | 12.35 mm | 12.35 mm | 12.35 mm | 12.35 mm |
| | hm | 5.9 mm | 5.9 mm | 5.9 mm | 5.9 mm | 5.9 mm |
| EFFECTIVE SCREW LENGTH | L | 1525 mm | 1525 mm | 1525 mm | 1525 mm | 1525 mm |
| | L/D | 19.1 | 19.1 | 19.1 | 19.1 | 19.1 |
| SUPPLY PORTION LENGTH | Lf | 797 mm | 777 mm | 867 mm | 827 mm | 877 mm |
| | Lf/D | 0.52 | 0.51 | 0.57 | 0.54 | 0.58 |
| COMPRESSION PORTION LENGTH | Lc | 480 mm | 410 mm | 420 mm | 490 mm | 500 mm |
| | Lc/L | 0.31 | 0.27 | 0.28 | 0.32 | 0.33 |
| MEASURE PORTION LENGTH | Lm | 248 mm | 338 mm | 238 mm | 208 mm | 148 mm |
| | Lm/L | 0.16 | 0.22 | 0.16 | 0.14 | 0.10 |
| COLOR CHANGE | — | NONE | SLIGHTLY PRESENT | NONE | NONE | NONE |
| PLASTICIZATION | — | EXCELLENT | EXCELLENT | EXCELLENT | EXCELLENT | SLIGHTLY BAD |
| EVALUATION | — | BETTER | GOOD | BETTER | BETTER | GOOD |

[Model 17]
(Difference and Similarity Relative to Model 3)

According to the model 17, Lf was shortened that was 777 mm, Lc was shortened that was 410 mm, and Lm was elongated that was 338 mm. The other specifications were the same as those of the model 3.
(Evaluation on Model 17)

According to the model 17, since the length Lm of the measure portion largely increased, a minor color change was observed. This may be because of an increase in temperature of the resin material due to the increase of Lm. However, a color change is slight, which is within an acceptable range, and thus the evaluation is concluded as "good".

[Model 18]
(Difference and Similarity Relative to Model 3)

According to a model 18, Lf was remarkably elongated that was 867 mm, Lc was shortened that was 420 mm, and Lm was remarkably shortened that was 238 mm. The other specifications were the same as those of the model 3.
(Evaluation on Model 18)

According to the model 18, since the length Lm of the measure portion remarkably decreased, a color change did not occur at all. This may be because of a decrease in temperature of the resin material due to the remarkable decrease of Lm. Consequently, the evaluation is concluded as "better" that is more than "good".

[Model 19]
(Difference and Similarity Relative to Model 3)

According to a model 19, Lf was slightly elongated that was 827 mm, Lc was slightly elongated that was 490 mm, and Lm was remarkably shortened that was 208 mm. The other specifications were the same as those of the model 3.
(Evaluation on Model 19)

According to the model 19, since the length Lm of the measure portion remarkably decreased, a color change did not occur at all. This may be because of a decrease in temperature of the resin material due to the remarkable decrease of Lm. Consequently, the evaluation is concluded as "better" that is more than "good".

[Model 20]
(Difference and Similarity Relative to Model 3)

According to a model 20, Lf was elongated that was 877 mm, Lc was slightly elongated that was 500 mm, and Lm was remarkably shortened that was 148 mm. The other specifications were the same as those of the model 3.
(Evaluation on Model 20)

According to the model 20, a slight plasticization defect was observed. This may be because of the decrease of Lm. However, the plasticization defect is little and is within in allowable range, and thus the evaluation is concluded as "good".

Since the model 3 has the same evaluation result as those of the models 18 and 19, and has the better evaluation result than those of the models 17 and 20, the evaluation is indicated as "better" in TABLE 9.
(Matters which Became Clear from Model 3, and Model 17 to Model 20)

Since the model 3 and the model 17 to the model 20 have the evaluations that are concluded as "good" or "better", all of such models are adoptable. However, the model 3, the model 18, and the model 19 have the better evaluations than those of the models 17 and 20. The following points became clear from such model 3, model 18, and model 19.

It is desirable that the length Lf of the supply portion should be (0.52 to 0.57) times as much as the effective screw length L, i.e., (52% to 57%) thereof.

Moreover, it is desirable that the length Lc of the compression portion should be (0.28 to 0.32) times as much as the effective screw length L, i.e., (28% to 32%) thereof.

Furthermore, it is desirable that the length Lm of the measure portion should be (0.14 to 0.16) times as much as the effective screw length L, i.e., (14% to 16%) thereof.

An injection screw according to the present disclosure is suitable for an injection molding of rigid vinyl chloride.

What is claimed is:

1. A rigid vinyl chloride injection screw which kneads and injects rigid vinyl chloride comprising: a flight; and a groove,
    wherein an effective screw length is distinguished at a supply portion, a compression portion, and a measure portion, a width of the flight within the supply portion is set to be wider than a width of the flight within the measure portion, and a depth of the groove at the supply portion is set to be larger than a depth of the groove at the measure portion,
    wherein L/D is set to be 19.1 where L is the effective screw length and D is a diameter of the injection screw,
    wherein tf/tm is set to be 2.5 where tf is the width of the flight within the supply portion and tm is the width of the flight within the measure portion,
    wherein hf/hm is set to be 2.1 where hf is the depth of the groove at the supply portion and hm is the depth of the groove at the measure portion, and
    wherein a compression ratio that is calculated from $((P-tf) \times hf)/((P-tm) \times hm)$ is set to be 1.74 where P is a pitch of the injection screw.

2. A rigid vinyl chloride injection screw which kneads and injects rigid vinyl chloride comprising: a flight; and a groove,
    wherein an effective screw length is distinguished at a supply portion, a compression portion, and a measure portion, a width of the flight within the supply portion is set to be wider than a width of the flight within the measure portion, and a depth of the groove at the supply portion is set to be larger than a depth of the groove at the measure portion,
    wherein L/D is set to be in a range that is 17.0 to 19.5 where L is the effective screw length and D is a diameter of the injection screw,
    wherein tf/tm is set to be in a range that is 2.3 to 3.0 where tf is the width of the flight within the supply portion and tm is the width of the flight within the measure portion,
    wherein hf/hm is set to be in a range that is 2.0 to 2.2 where hf is the depth of the groove at the supply portion and hm is the depth of the groove at the measure portion, and
    wherein a compression ratio that is calculated from $((P-tf) \times hf)/((P-tm) \times hm)$ is set to be in a range that is 1.63 to 1.81 where P is a pitch of the injection screw.

3. The rigid vinyl chloride injection screw according to claim 2, wherein the L/D is 17.0.

* * * * *